Patented Mar. 6, 1951

2,544,392

UNITED STATES PATENT OFFICE 2,544,392

BASE-CATALYZED VAPOR-PHASE PRODUCTION OF ETHERS FROM ALCOHOLS AND OLEFINS

Robert J. Moore, Berkeley, and Gordon J. O'Donnell, Oakland, Calif., assignors to Shell Development Company, San Francisco, Calif., a corporation of Delaware No Drawing. Application September 8, 1947, Serial No. 772,892

13 Claims. (Cl. 260—614)

This invention relates to the production of ethers by a vapor phase reaction of olefins with alcohols in the presence of a basic catalyst. More particularly, the invention provides a process for the preparation of ethers containing a secondary or tertiary alkyl radical by contacting mixtures of the vapors of olefins and alcohols with a non-volatile alkaline material, preferably under a superatmospheric pressure. In its most specific embodiment the invention provides a method of converting the olefinic by-products of the petroleum industries into commercially valuable ethers by reaction with alcohols in a continuous process requiring but a single operational step.

Heretofore the preparation of ethers from olefins has required several operational steps or has embodied substantial losses of the reactants and catalysts due to the formation of relatively valueless side-reaction products. For example, the olefins were converted to the halo derivatives and subsequently treated by the well-known processes to form ethers. This required several operational steps, and since it is relatively difficult to produce monohalo compounds the production of unsubstituted ethers by such processes is correspondingly difficult. Similarly, olefins were first hydrated, usually in the presence of sulfuric acid or a derivative of a strong acid, and subsequently converted to ethers by reaction processes such as a high temperature treatment in the presence of an acid-acting compound. Such processes cause the rapid loss of activity of the catalyst and form numerous hydrocarbon and carbonyl side-reaction products. It is known that in the presence of acid-acting compounds, the tertiary olefins can be directly converted to ethers at relatively low reaction temperatures, but the acid-acting compounds are good polymerization catalysts for the olefins and much of the olefin reactant is lost in the formation of polymers. Further, under continuous operation the activity of the solid catalysts rapidly declines due to the accumulation of the polymeric substances on their surfaces.

It is, therefore, a principal object of the present invention to provide an economical process requiring but a single operational step for the continuous conversion of olefins to ethers. Another object is the provision of a vapor-phase conversion process for the olefinic by-products of the petroleum industry which employs a low-cost inorganic alkaline catalyst that may be used continuously without substantial loss of catalyst activity. A further object is the provision of a process for the direct conversion of olefins to ethers in the substantial absence of polymerization reactions. Still other objects and advantages of the present process will be apparent from the following description.

It has now been unexpectedly discovered that when the vapors of an olefin and an alcohol are contacted under the proper reaction conditions in the presence of non-volatile inorganic hydroxides and oxides, substantially all of the olefin that reacts is directly converted to an ether without losses due to polymerization.

The etherification reaction takes place in the vapor-phase and is favored by increased pressure. While the invention is not limited to any particular reaction mechansim, it appears that as in the case of the acid-catalyzed addition of alcohols to olefins, an equilibrium condition is reached in the reactor which may be represented by the following general reactions:

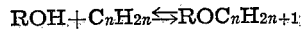

$$ROH + C_nH_{2n} \rightleftharpoons ROC_nH_{2n+1}$$

An increase in the reaction temperature increases the speed with which the various components react, but it causes a shift of the equilibrium to the left to favor the production of the olefin and alcohol. An increase in the reaction pressure causes a shift of the equilibrium to the right to favor the production of the ether, but excessive pressures must be avoided to insure that the reactants are in the vapor-phase at a given temperature. It is therefore necessary in each particular case to correlate the reaction temperature and pressure so that the reactants are maintained in the vapor phase while a sufficiently high reaction rate is maintained.

It has been found that in general, practical amounts of the ether are produced at reaction temperatures of between about 100° C. and 400° C., but that the mol precent conversion to the ether falls rapidly as the temperature is increased to above about 300° C. The most satisfactory conversions per pass through the reactor have been obtained at temperatures between about 190° C. and about 210° C.

In general, reaction pressures of above about 8 atmospheres cause the formation of practical amounts of the ether per pass through the reactor, and the upper limit of the suitable reaction pressures to be employed in any given case will depend upon the particular reactants employed and the reaction temperature. The most satisfactory reaction pressures have been found to be between about 10 and 16 atmospheres when the reactants are of a relatively low molecular weight and a reaction temperature of between about 190° C. and 210° C. is employed.

A particular advantage of the present process is the formation of practically no side reaction products under moderate reaction conditions, thereby facilitating the recovery and reemployment of the unconverted reactants. When, for example, isobutene and methanol are contacted at about 200° C. and under about 10 atmospheres the reactor effluent gases are almost entirely composed of only the desired ether, and the unconverted olefin and alcohol. There is no evidence of polymerization or of saturation of the olefin to isobutane. The effluent gases may therefore, be conveniently separated by simply condensing in water and distilling separately the water soluble and the water insoluble portions of the liquefied reaction products.

The process may suitably be applied to the conversion of any olefin which is sufficiently volatile to form practicable amounts of vapor under the conditions of the reaction. In general, olefins having a critical temperature of not more than about 350° C. are the preferred starting compounds. Illustrative examples of suitable olefins include ethylene, propylene, isobutene, 2-methyl-2-hexane, 2-ethyl-2-pentene, 2-propyl-2-butene, 2-methyl-2-pentene, 2-isopropyl-2-butene, 1-butene, 2-butene, 2-pentene, 2-hexene, 3-methyl-1-butene, 2-methyl-1-butene, 2,4,4-trimethyl-1-butene, 2-ethyl-1-pentene, 2-methyl-1-pentene, 2-propyl-1-butene, 2-isopropyl-1-butene, and the like.

As a class, the tertiary olefins, i. e., the olefins in which one of the carbon atoms linked by the double bond is attached to two other carbon atoms, are the most reactive and are the preferred class of olefinic starting compounds for the present process. The particularly preferred subclass of starting materials are, therefore, the tertiary olefins having a critical temperature of not more than about 250° C., such as isobutene, 2-methyl-2-butene, and the like.

The olefinic starting materials may be individual compounds, a mixture of olefins or a mixture containing olefins in the presence of inert substances such as hydrocarbons, ethers and the like. The process may be readily adapted to the conversion of olefin containing mixtures, such as cracking process effluents, to commercially valuable mixed ethers. For example, by a fractional distillation under substantially the same conditions of pressure and temperature to be applied in the subsequent conversion process, an olefin containing mixture suitable for etherification by the present process can be obtained from any mixture of unsaturated hydrocarbons containing a relatively high portion of volatile components.

The present process is similarly applicable to substantially any alcohol having analogous properties of volatility, i. e., having a critical temperature of not more than about 350° C. Olefinic as well as saturated monohydric alcohols may be employed in the absence of polymerization catalyzing substances such as oxygen and peroxides. The alcohols may be individual compounds, a mixture of alcohols or a mixture containing alcohols in the presence of inert substances such as hydrocarbons, ethers and the like.

In general, alcohols of not more than about 4 carbon atoms, especially saturated aliphatic alcohols, are preferred. Illustrative of the preferred alcohols are the, methyl, ethyl, propyl, isopropyl, normal, secondary, and tertiary-butyl alcohols, of which the olefinic or alicyclic analogs such as, allyl, the butenyl and the cyclo-butyl alcohols may also be employed.

Basic catalysts suitable for the present process may comprise any non-volatile metal hydroxide or oxide of an alkaline reacting metal, but preferably consists of mixed hydroxides and oxides. The alkaline reacting metals are the light and heavy metals listed on the left hand portion of the periodic table of the elements arranged as illustrated in "General Chemistry," fifth edition, by H. G. Deming, published by John Wiley and Sons, Inc. The mixed hydroxides and oxides of the alkali and alkaline earth metals have been found particularly active and are the preferred class of basic catalysts, e. g., an activated alkaline earth metal oxide such as activated magnesia impregnated with an alkali metal hydroxide.

Numerous procedures may be followed in the preparation of the catalyst, the essential features of the preferred method being the formation of a mixture containing a major portion of the metal oxide and a minor portion of the metal hydroxide so supported as to present a large available surface area and freed of volatile reactive substances such as moisture or volatile nitrogen or sulfur containing compounds. A particularly effective procedure is the following, as illustrated by the preparation of a potassium hydroxide-magnesium oxide catalyst:

An activated magnesia having a surface area of 10 square meters or more per gram is impregnated with an amount of potassium hydroxide sufficient to provide about 10% by weight of potassium hydroxide dissolved in just enough water to dampen the magnesia without forming an excess. The compound may then be dried at 120° C. to 150° C. and formed into pellets, granules or the like as desired.

Any reactor suitable for bringing vapors under pressure into contact in the presence of a non-volatile catalyst may suitably be employed in the present process, and since neither the catalyst nor the reactants are corrosive towards the ferrous metals the reactor may be constructed of or lined with any of the commonly employed metallic materials. Flow systems capable of withstanding superatmospheric pressure operations comprising a metal tube to contain the catalyst in the form of granules or pellets have been found to be particularly suitable reactors for the present process.

To illustrate the operation under the preferred reaction conditions, the conversion of isobutylene to methyl tertiary-butyl ether and of 3-methyl-1-butene to ethyl methylisopropylcarbinyl ether will be described in detail below. By the employment of similar reaction conditions, varying the temperature and contact time as desired to obtain the desired yield of ether per pass through the reactor, the following conversions may suitably be attained.

2-ethyl-2-butene+propyl alcohol→
    propyl methyldiethylcarbinyl ether
2-pentene+ethyl alcohol→
    ethyl diethylcarbinyl ether
isobutene+isopropyl alcohol→
    isopropyl tertiary-butyl ether
isobutene+tertiary-butyl alcohol→
    ditertiary-butyl ether

*Example I*

The preparation of methyl tertiary-butyl ether from isobutene and methyl alcohol:

A catalyst was prepared by impregnating 90 parts by weight of an active magnesia having not less than 10 square meters of surface per gram with 10 parts by weight of KOH dissolved in just enough water to moisten all of the magnesia. The resulting combination was heated for about 4 hours at from 120° C. to 150° C., and 100 ml. of the catalyst was placed in a stainless steel tube having an internal diameter of 1 inch.

Isobutylene and methyl alcohol vapors in about equimolar proportions were passed over the catalyst under about 13 atm. pressure at a temperature of about 200° C. The rate of flow was adjusted to provide a total continuous contact time for the vapors of 7.5 minutes assuming 100% void catalyst space.

The reaction products were separated by distillation after extraction of the unchanged alcohol by washing. The water-insoluble portion of the product was found to contain methyl tertiary-butyl ether as identified by its boiling point and infra-red spectrometer analysis. There was no evidence of polymerized olefinic materials nor of saturated hydrocarbons; traces of dimethyl ether were the only side reaction components indicated by a mass spectrometric analysis. The yield of the ether amounted to a 10 mol percent conversion per pass of the reactants over the catalyst making due allowance for the solubility of the ether product in the wash water.

*Example II*

The preparation of ethyl methylisopropylcarbinyl ether from 3-methyl-1-butene and ethyl alcohol:

A sodium hydroxide-magnesium oxide catalyst may be prepared by treating an active magnesia in the manner described above with an aqueous sodium hydroxide solution.

When ethyl alcohol and 3-methyl-1-butene are passed over the catalyst in a reactor similar to that described in Example I under about 13 atms. pressure and at a temperature of about 200° C., the conversion product will consist of ethyl methylisopropylcarbinyl ether. The reactor effluents can readily be separated in the manner described above and the unconverted reactants recycled through the reactor to attain a high conversion to the desired ether.

We claim as our invention:

1. A method of preparing methyl tertiary-butyl ether which comprises passing substantially equimolar portions of methyl alcohol and isobutylene under a pressure of from 10 to 16 atmospheres over a solid catalyst consisting of 10 parts by weight of potassium hydroxide and 90 parts by weight of magnesium oxide at a temperature of from 190° C. to 210° C.

2. A method of preparing ethyl methylisopropylcarbinyl ether which comprises passing substantially equimolar portions of ethyl alcohol and 3-methyl-1-butene under a pressure of from 10 to 16 atmospheres over a solid catalyst consisting of 10 parts by weight of potassium hydroxide and 90 parts by weight of magnesium oxide at a temperature of from 190° C. to 210° C.

3. A process for the conversion of an olefin-containing mixture which comprises fractionally distilling the mixture under a pressure of from 10 to 16 atmospheres and at a temperature of from 190° C. to 210° C., mixing with the olefin-containing fraction vaporized by said distillation, an alkanol having a critical temperature of not more than about 350° C. and contacting the vapors of the resultant mixture under a pressure of from 10 to 16 atmospheres and at a temperature of from 190° C. to 260° C. with a solid catalyst consisting of a minor portion of sodium hydroxide and a major portion of magnesium oxide.

4. A process for the production of ethers containing a tertiary alkyl radical which comprises contacting the vapors of tertiary olefins and alkanols having critical temperatures of not more than about 250° C. with a catalyst consisting of a major portion of an alkaline earth metal oxide and an alkali metal hydroxide at a temperature of from 250° C. to 400° C. and under a pressure of not less than 8 atmospheres.

5. A method of preparing ethers containing a tertiary alkyl radical which comprises contacting the vapors of a tertiary olefin of not more than about 7 carbon atoms, no more than 6 of which are contained in a straight chain, and of an alkanol of not more than about 4 carbon atoms under a pressure of from 8 to 16 atmospheres and at a temperature of from 100° C. to 400° C. with a catalyst consisting of a minor amount of an alkali metal hydroxide with a major amount of an alkaline earth metal oxide.

6. A method of preparing methyl tertiary-butyl ether which comprises passing substantially equimolar portions of methyl alcohol and isobutylene under a pressure of from 10 to 16 atmospheres over a solid catalyst consisting of 10 parts by weight of an alkali metal hydroxide and 90 parts by weight of an alkaline earth metal oxide.

7. A method of preparing ethyl methylisopropylcarbinyl ether which comprises passing substantially equimolar portions of ethyl alcohol and 3-methyl-1-butene under a pressure of from 10 to 16 atmospheres over a solid catalyst consisting of 10 parts by weight of an alkali metal hydroxide and 90 parts by weight of an alkaline earth metal oxide.

8. A method of preparing ethers containing a tertiary alkyl radical which comprises contacting the vapors of a tertiary olefin of not more than about 7 carbon atoms, and of an alkanol of not more than about 4 carbon atoms under a pressure of from 8 to 16 atmospheres and at a temperature of from 100° C. to 400° C. with a catalyst consisting of mixed non-volatile inorganic hydroxides and oxides of alkaline reacting metals.

9. A process for the production of methyl branched chain alkyl ethers which comprises contacting the vapors of methyl alcohol with the vapors of an olefin of not more than about 8 carbon atoms, no more than 7 of which are in a straight chain with a catalyst consisting of a major portion of an alkaline earth metal hydroxide and a minor portion of an alkali metal hydroxide under a pressure of from 8 to 16 atmospheres and a temperature of from 100° C. to 400° C.

10. A method of preparing methyl tertiary-alkyl ethers which comprises contacting methyl alcohol with a tertiary olefin having a critical temperature of not more than 350° C. in the presence of a catalyst consisting of mixed non-volatile metal oxides and hydroxides of alkaline reacting metals at a temperature of between 190° C. and 210° C. under a pressure of above 8 atmospheres but below that at which substantially all of the reactants remain in the liquid phase.

11. A process for the production of ethers which comprises contacting alkanols and olefins having critical temperatures of not more than about 350° C. in the presence of a non-volatile alkaline material comprising at least one material of the group consisting of the oxides and hydroxides of the alkaline reacting metals under a pressure of between 10 and 16 atmospheres and at a temperature sufficient to vaporize the major portion of the olefinic and alcoholic reactants.

12. A process for the production of ethers which comprises contacting alkanols and olefins having critical temperatures of not more than about 350° C. in the presence of a non-volatile alkaline material comprising at least one material of the group consisting of the oxides and hydroxides of the alkaline reacting metals at a temperature between 100° C. and 400° C. and under a pressure of above 8 atmospheres but low enough to maintain the reactants in the vapor phase.

13. A process for the production of ethers which comprises contacting alkanols and olefins having critical temperatures of not more than about 350° C. in the presence of a non-volatile alkaline material comprising at least one material of the group consisting of the oxides and hydroxides of the alkaline reacting metals in the vapor phase at a temperature between 100° C. and 400° C. and under a pressure of between 8 and 10 atmospheres.

ROBERT J. MOORE.
GORDON J. O'DONNELL.

REFERENCES CITED

The following references are of record in the file of this patent:

UNITED STATES PATENTS

| Number | Name | Date |
| --- | --- | --- |
| 1,968,601 | Edlund et al. | July 31, 1934 |
| 2,010,356 | Evans | Aug. 6, 1935 |
| 2,021,869 | Reppe et al. | Nov. 19, 1935 |
| 2,066,076 | Reppe et al. | Dec. 29, 1936 |
| 2,143,021 | Martin | Jan. 10, 1939 |